United States Patent [19]

Kuo et al.

[11] Patent Number: 5,982,926
[45] Date of Patent: Nov. 9, 1999

[54] REAL-TIME IMAGE ENHANCEMENT TECHNIQUES

[75] Inventors: Shyh-Shiaw Kuo, East Brunswick; Minakanagurki V. Ranganath, Lincroft, both of N.J.

[73] Assignee: AT & T IPM Corp., Coral Gables

[21] Appl. No.: 08/373,710

[22] Filed: Jan. 17, 1995

[51] Int. Cl.⁶ .............................. G06K 9/00; G06K 9/36; G03F 3/08
[52] U.S. Cl. ......................... 382/167; 382/169; 382/274; 358/518; 358/522
[58] Field of Search .................................. 382/132, 167, 382/169, 274; 358/518, 520, 522

[56] References Cited

U.S. PATENT DOCUMENTS

| | | | |
|---|---|---|---|
| 4,905,287 | 2/1990 | Segawa | 381/43 |
| 5,063,607 | 11/1991 | Fritzhenry et al. | 382/169 |
| 5,075,896 | 12/1991 | Wilcox et al. | 382/39 |
| 5,261,009 | 11/1993 | Bokser | 382/40 |
| 5,321,773 | 6/1994 | Kopec et al. | 382/30 |
| 5,450,502 | 9/1995 | Eschbach et al. | 382/274 |
| 5,452,018 | 9/1995 | Capitant et al. | 358/520 |
| 5,487,020 | 1/1996 | Long | 358/520 |
| 5,504,821 | 4/1996 | Kanamori et al. | 382/274 |
| 5,544,258 | 8/1996 | Levien | 382/274 |

OTHER PUBLICATIONS

Digital Image Processing by Rafael C. Gonzalez 1977, pp. 123–134.

"Automatic Recognition of Keywords in Unconstrained Speech UsingHidden Markov Models", J. Wilpon et al., IEEE Trans. Acoust. Speech Signal Processing, vol. 38, pp. 1870 1878, Nov. 1990.

"Connected and Degraded Text Recognition Using Hidden Markov Model" by C. Bose et al., Proc. of the 11th Int. Conf. on Pattern Recognition, 1992.

"Global–to–Local Layout Analysis" by H. Baird, Proceedings of the IAPR Workshop on Syntactic and Structural Pattern Recognition, France, Sep. 1988.

"Document Image Analysis" by S. Srihari et al., Proceedings of the 8th International conference on Pattern Recognition, Paris, Oct. 1986.

"A Tuturial on Hidden Markov Models and Selected applications in Speech Recognition" by L. Rabiner, Proceedings of the IEEE, vol. 77, pp. 257–286, Feb., 1989.

"A Segmental k–Means Training Procedure for Connected Word Recognition Based on Whole Word Reference Patterns", L. Rabiner et al., AT&T Technical Journal, vol. 65, pp. 21–36, May 1986.

"Pseudo two–dimensional hidden markov models for document recognition" by O. E. Agazzi et al., AT&T Technical Journal, vol. 72, pp. 60–72, Sep./Oct. 1993.

"Fundamentals of Speech Recognition", L. Rabiner and B. Juang, PTR, Prentice Hall, 1993. Comment: Because of the voluminous nature of this book, applicants have not included it with this information disclosure statement but have elected to cite the reference. If the Examiner requires the book during prosecution of this application, Applicants will provide a copy of it.

"Hidden Markov Model Based Optical Character Recognition in the Presence of Deterministic Transformations", by O.E. Agazzi et al., Pattern Recognition, vol. 26, No. 12, 1993.

(List continued on next page.)

*Primary Examiner*—Andrew W. Johns
*Assistant Examiner*—Monica S. Davis

[57] ABSTRACT

Improved image enhancement methods are disclosed which may be performed on conventional video processing systems. These methods operate in real time to improve the appearance of images as perceived by the human eye, and/or to render these images more suitable for computer analysis. A first preferred embodiment enhances color images without degrading the fidelity of the image. A second preferred embodiment enhances scanned gray-level document images by decreasing the blurring of the image and increasing the contrast between light and dark regions of the image.

5 Claims, 6 Drawing Sheets

OTHER PUBLICATIONS

"Keyword Spotting in Poorly Printed Documents Using Pseudo 2d Hidden Markov Models,", by S. Kuo et al., IEEE Trans. on PAMI, vol. 16, pp. 842–848, Aug. 1994.

"Connected and Degraded Text Recognition Using Planar Hidden Markov Models",by O. E. Agazzi et al., in Proc. of ICASSP'93, pp. V113–V116, 1993.

"Direct gray–scale extraction of features for character recognition," by L. Wang et al., IEEE Trans. on PAMI, vol. 15, Oct. 1993.

"A frame–synchronous Network Search Algorithm for Connected Word Recognition" by C. Lee et al., IEEE trans. Acouts. Speech Signal Processing, vol. ASSP–37, pp. 1649–1658, Nov. 1989.

"Recognition of Isolated Digits Using Hidden markov Models with Continuous Mixture Densities" by L. R. Rabiner et al., AT&T Tech. J. vol. 64, pp. 1211–1222, Jul./Aug. 1985.

"Minimum Error Thresholding" by J. Kittler et al., Pattern Recognition, vol. 19, pp. 41–47, 1986.

REAL-TIME IMAGE ENHANCEMENT TECHNIQUES

BACKGROUND OF THE INVENTION

1. Field of the Invention

The invention relates generally to image enhancement techniques, and more specifically to real-time image enhancement methods which are performed on textual and/or color photographic images.

2. Description of the Prior Art

Image enhancement is a process by which acquired image data values are manipulated. Such manipulation is typically directed to improving the appearance of the data as perceived by humans, and/or to render the data more suitable for machine analysis of the image. Image enhancement processes are distinguishable from image restoration processes in that one objective of restoration processes is to improve the fidelity and/or accuracy of a reproduced image with respect to the original image, whereas enhancement processes place greater emphasis on human visual perception and/or the suitability of the processed image for computer analysis.

Various image enhancement processes have been developed for improving the perceived clarity, intelligibility, and/or quality of images. These image enhancement processes attempt to render images more pleasing to human eyes, irrespective of whether or not these images are accurately reproduced. Oftentimes, a distorted image is more pleasing to the human eye than a perfectly reproduced copy of the original image. For example, if overshoot or undershoot is incorporated into the edges of an image, the resulting image is typically perceived as being more pleasing than an image without such undershoot or overshoot.

Many prior art image enhancement processes have focused on the improvement of gray-level images, but a direct extension of these processes into the color domain results in degraded or suboptimal images. At the present time, there is a notable lack of image enhancement techniques which are optimized for use in conjunction with color images. The widespread distribution of color images, the growing popularity of multimedia applications, the current proliferation of personal computing devices, and the development of high-definition television systems all serve to increase the demand for improved color image enhancement methods. Such image enhancement methods should be optimized for use in conjunction with color images, and should not merely constitute the reapplication of a gray-level method to the color domain. Moreover, such image enhancement methods should operate in real time using existing hardware platforms.

Although it is possible to enhance a color image by applying existing monochrome image enhancement algorithms to each color component (red, green, and blue) individually, the resulting image may not be enhanced optimally. Image distortion will result if the red, green, and blue components are not properly recombined after the monochrome image enhancement algorithms are applied. Moreover, image distortion will also result if the red, green, and blue components are processed independently, without considering correlation among the components.

SUMMARY OF THE INVENTION

Improved image enhancement methods are disclosed which may be performed on conventional video processing systems. These methods operate in real time to improve the appearance of images as perceived by the human eye, and/or to render these images more suitable for computer analysis. A first preferred embodiment enhances color images without degrading the color fidelity of the image. A second preferred embodiment enhances gray-level textual images by decreasing the blurriness of the image, by increasing the contrast between light and dark regions of the image, and by removing image artifacts which are introduced by conventional, block-based compression algorithms.

According to the first preferred embodiment, a color image is represented by a plurality of pixels in HSV (hue, saturation, and intensity) color space. The color image exhibits a finite range of intensity values and a finite range of saturation values. The image is enhanced by applying a first transformation function to the intensity components of the image and a second transformation function to the saturation components of the image. The first transformation function transforms the range of intensity values in the image to correspond to the entire dynamic range of intensity values available in the video processing system. The second transformation function transforms the range of saturation values in the image to correspond to the entire dynamic range of saturation values available in the video processing system. The transformation functions provide an enhanced image having fully optimized intensity and saturation components. The enhanced image is provided by optimally allocating the available dynamic range of intensity and saturation values of the video processing system. Saturation and intensity are enhanced to their extremes without the introduction of color distortion.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

DETAILED DESCRIPTION OF THE PREFERRED EMBODIMENTS

Figure 1:
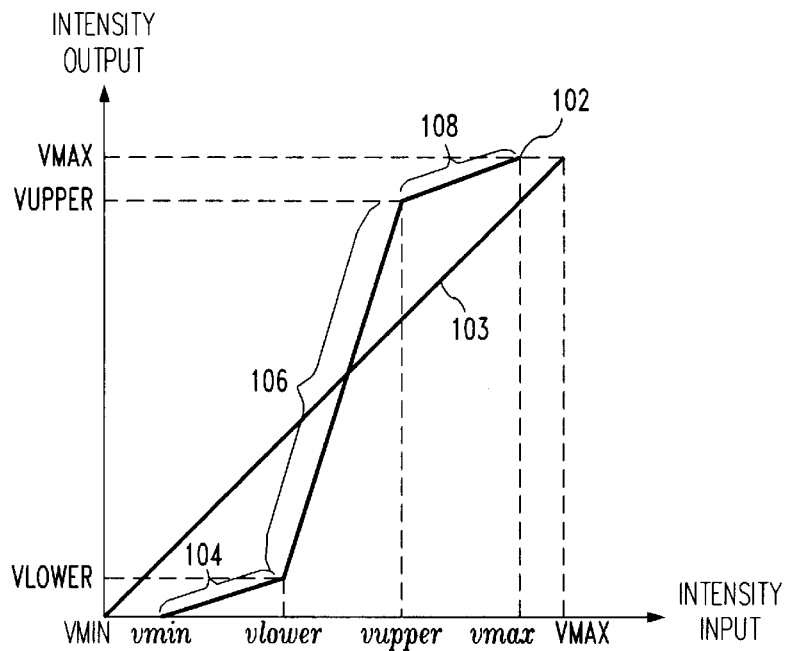
FIG. 1 is a graphical representation of a transformation function for mapping the intensity components of a color image.

The image enhancement methods disclosed herein are directed to improving the appearance of images as perceived by the human eye, and/or to render these images more suitable for computer analysis. A first preferred embodiment enhances color images without degrading image fidelity, and a second preferred embodiment enhances scanned gray-level document images by decreasing the blurring of the image and by increasing the contrast between light and dark regions of the image. Presently-existing video processing systems can perform the image enhancement methods disclosed herein in real time. Suitable video processing systems may include, for example, a microprocessor and a video memory, both of which are present in conventional video telephones such as the AT&T Picasso Still-Image Phone. The AT&T Picasso Still Image Phone is disclosed in copending U.S. patent application Ser. No. 08/202,608.

With respect to the first embodiment, a color image can be enhanced much more effectively in HSV (hue, saturation, and intensity) color space than in RGB (red, green, and blue) color space. In HSV color space, the color information (hue) is isolated and removed from the remaining image components (saturation and intensity). In this manner, saturation and intensity may be enhanced to the maximum extent possible, without introducing distortion into the color (hue) component. Any color image may be represented by a plurality of pixels in HSV (hue, saturation, and intensity) color space. For example, well-known methods may be used to convert a conventional NTSC, SECAM, RGB, or PAL video signal into HSV color space. In some cases, this conversion process is implemented by performing relatively simple computations, but in other cases, nonlinear mathematical operations are required. Such nonlinear operations are computationally expensive. Therefore, the immediately following description will consider image enhancement in the context of HSV color space, after which image enhancement in other color spaces will be discussed.

Every color image exhibits a finite range of intensity values and a finite range of saturation values. Moreover, in HSV space, these intensity and saturation values are specified as individual components of the image. Conventional video processing systems are equipped to process a finite range of intensity values, as well as a finite range of saturation values. However, the range of intensity values present in the image is not necessarily identical to the total dynamic range of intensity values which conventional video processing systems are equipped to process. Similarly, the range of saturation values present in the image is not necessarily identical to the total dynamic range of saturation values which conventional video processing systems are equipped to process.

Typically, the available dynamic range of the video processing system is much wider than the range of intensity and saturation values included in a color image. Therefore, unless image enhancement methods are applied to the image, only a portion of the available dynamic range of the video processing system will be utilized. If the image is underexposed, the intensity values of the image are clustered towards one extreme of the available dynamic range of the video processing system, and remaining portions of the dynamic range are relatively underutilized. If the image is overexposed, the intensity values of the image are clustered towards another extreme of the available dynamic range, and remaining portions of the dynamic range are likewise underutilized.

A first transformation function is applied to the intensity values of the image to optimally utilize the available intensity value dynamic range of the video processing system. A second transformation function is applied to the saturation values of the image to optimally utilize the available saturation value dynamic range of the video processing system. The hue values of the original image are not changed. The purpose of the first transformation function is to allocate the dynamic range of intensity values provided by the video processing system to optimally correspond to the dynamic range of intensity values included in the original color image. The second transformation function allocates the dynamic range of saturation values provided by the video processing system to optimally correspond to the dynamic range of saturation values included in the original color image.

The first transformation function is a piece wise linear mapping function in two dimensions having three substantially linear regions defined by four intensity value points. A first dimension represents intensity input values (i.e., intensity values included in an image to be processed), and a second dimension represents intensity output values (i.e., optimized intensity values for the enhanced image). A first intensity value point is represented by the minimum intensity value in a given image, a second intensity value point is represented by the maximum intensity value in this image, and the third and fourth intensity value points are selected to be between the first and second intensity value points. Selection of specific values for the third and fourth intensity value points are determined by the extent to which a given image is under- or over-exposed.

Refer now to FIG. 1, which is a graphical representation of an illustrative transformation function for mapping the intensity components of a color image. Image enhancement is performed by transforming the intensity values of the image using a piece wise linear mapping function 102 for the intensity component. The piece wise linear mapping function 102 consists of three line segments 104, 106, 108. Line segment 104 is defined by points vmin and vlower, line segment 106 is defined by points vlower and vupper, and line segment 108 is defined by points vupper and vmax. vmin and vmax denote the minimum and maximum intensity levels, respectively, in the original image. vlower and vupper determine the dynamic range allocation for lower, intermediate, and higher ranges of intensity levels.

The range of intensity values in the original image specifies values for vmin and vmax. The values of vlower and vupper are then selected to optimize image enhancement for a given image, based upon the characteristics of the image to be enhanced. For example, if the original image to be enhanced is under-exposed, vlower and vupper should be selected with a view towards enhancing lower intensity levels. Therefore, a greater proportion of the available dynamic range of the video processing system should be allocated to the lower intensity range. Such an allocation is accomplished by selecting vlower to be relatively close to vmin, and by selecting vupper to be relatively far away from vmax. In this manner, high intensity levels are compressed, and low intensity levels are expanded.

If the original image is over-exposed, vupper should be relatively close to vmax, and vlower should be relatively far away from vmin. In this manner, lower intensity levels are compressed, and high intensity levels are expanded. A greater portion of the video processing system's dynamic range will then be allocated to higher intensity levels.

FIG. 1 includes an identity mapping function 103 which will be discussed hereinafter in connection with the second transformation function and image saturation values.

Figure 2:
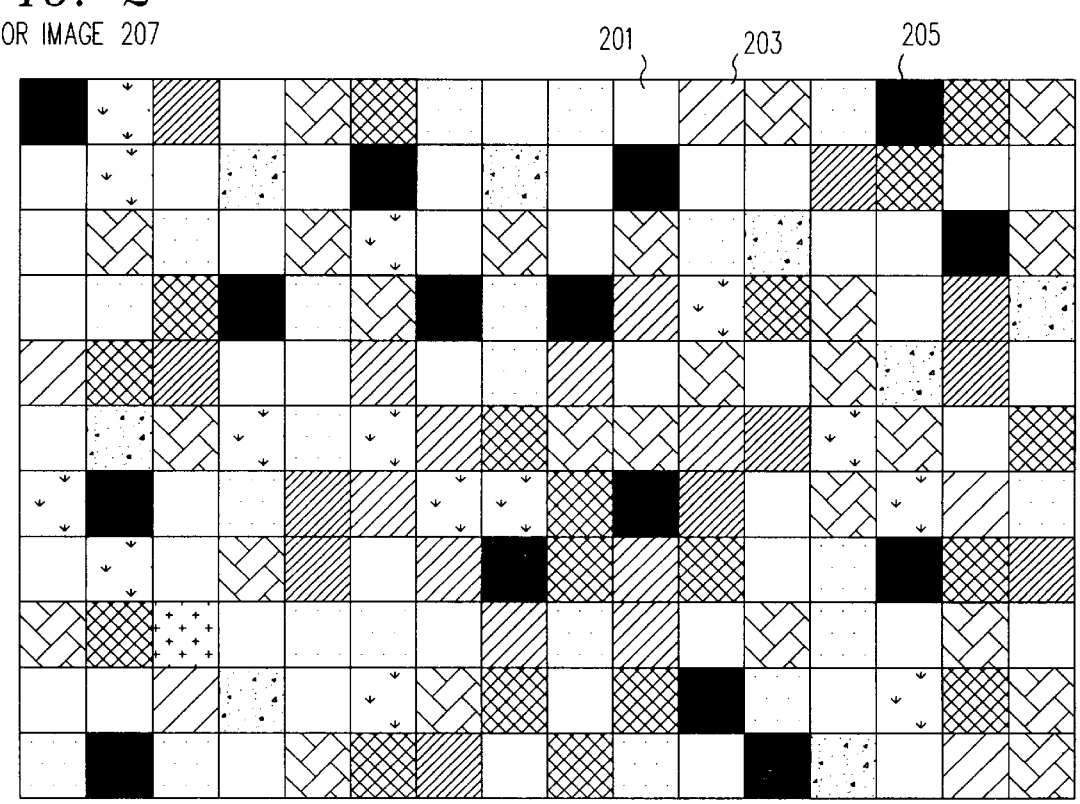
FIG. 2 illustrates intensity components for an exemplary color image comprised of a plurality of pixels.
Figure 3:
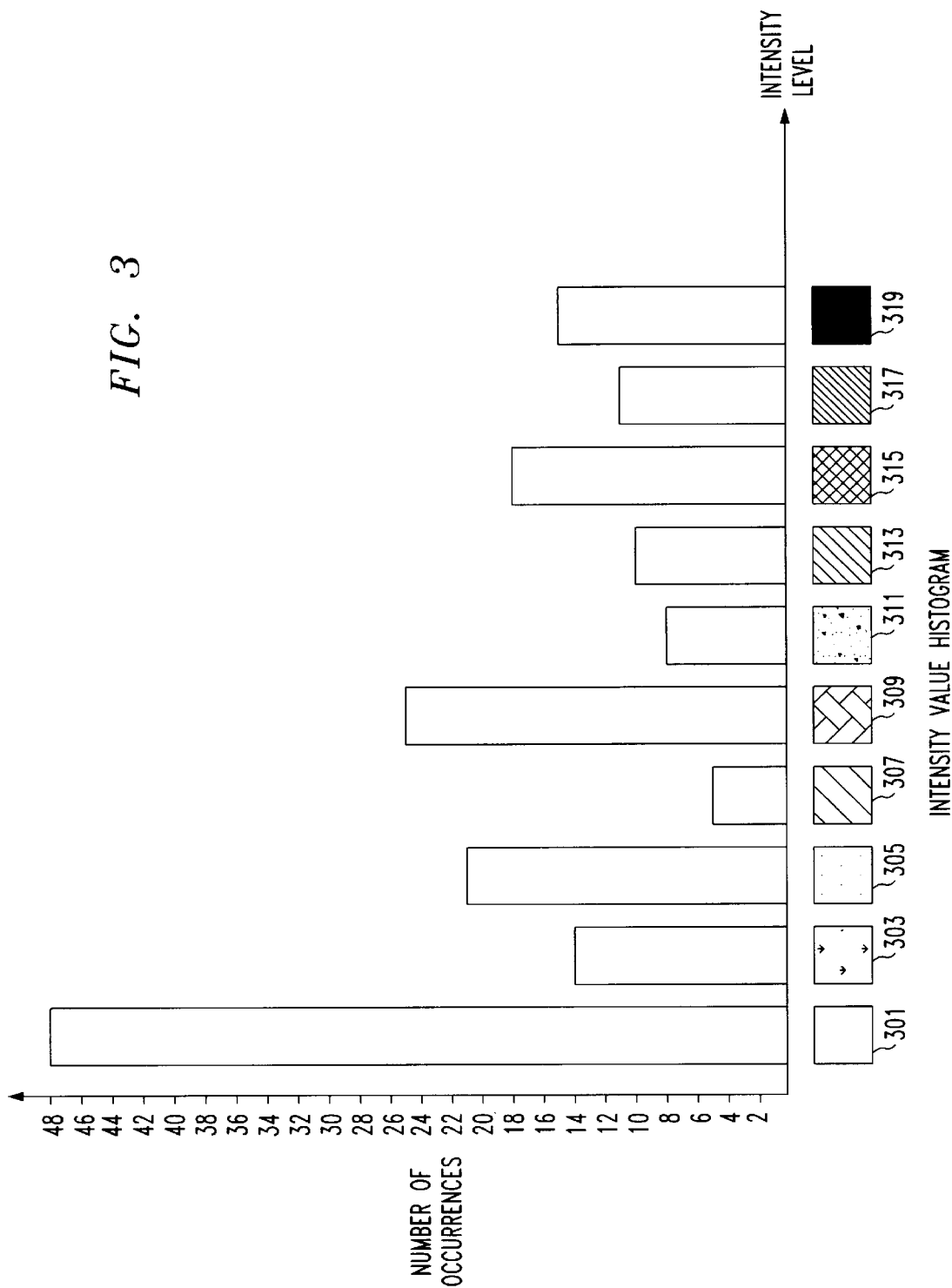
FIG. 3 is a histogram showing the relative distribution of intensity components for the image of FIG. 2.

With reference to FIGS. 2 and 3, specific calculations for vupper and vlower may be performed by developing an intensity value histogram for the image to be enhanced. Such an histogram divides the range of intensity values present in a given image, i.e., the range from vmin and vmax, into a plurality of sub-ranges. For each of the plurality of sub-ranges, the number of pixels in the image having intensity values in this sub-range is determined. The first moment of the histogram may be conceptualized as the "center of gravity" of the histogram. The "center of gravity, i.e. the first moment, may be calculated by using the formula $$\left\{\begin{matrix} \text{First} \\ \text{Moment} \\ \text{of} \\ \text{Histogram} \end{matrix}\right\} = \frac{\sum_{i=1}^{N}(h_i * I_i)}{\sum_{i=1}^{N} h_i}$$

where $I_i$ represents a specific intensity level, $h_i$ is the number of pixels having intensity level $I_i$, and N is the total number of intensity levels (sub-ranges). For example, intensity level 301 (FIG. 3) may be conceptualized as representing intensity level one ($I_1$), intensity level 303 may be conceptualized as representing intensity level two ($I_2$), and intensity level 319 may be conceptualized as representing intensity level ten ($I_{10}$). In this example, there are ten intensity levels (i.e., ten sub-ranges), so N is equal to 10.

FIG. 2 illustrates intensity components for an exemplary color image 207 comprised of a plurality of pixels 201, 203, and 205. Each pixel 201, 203, 205 is associated with a specific value representing the intensity component for that pixel. For example, pixel 201 is white, which may be defined as representing a relatively low value of intensity. In this manner, pixel 205, in black, represents a relatively high value of intensity, and pixel 203, in diagonal cross-hatching, represents an intermediate value of intensity with respect to pixels 201 and 205.

FIG. 3 is an intensity value histogram showing the relative distribution of intensity components for the color image 207 of FIG. 2. The intensity value histogram shows the number of pixels in a given image that have specific intensity values. The y-axis, labelled in "number of occurrences", is in units of pixels, and the x-axis represents intensity levels. In the example of FIGS. 2 and 3, ten different intensity values are employed to represent the pixel intensity values of the image. With reference to FIG. 3, the lowest intensity value is represented by intensity value 301 (shown in white), intermediate intensity values are represented by intensity values 303, 305, 307, 309, 311, 313, 315, and 317, and the highest intensity value is represented by intensity value 319 (shown in black). From the intensity value histogram of FIG. 3, it is observed that the color image 207 includes 48 pixels having intensity value 301, 14 pixels having intensity value 303, 22 pixels having intensity value 305, etc. The first moment of the intensity histogram is the intensity value including the greatest number of pixels which, in the present example, is intensity value 301 having a total of 48 pixels.

The first moment of the intensity value histogram provides an indication as to the relative over- or under-exposure of a given image. The first moment is closer to vmin (FIG. 1) for an underexposed image, and closer to vmax for an overexposed image. Based upon the first moment of the intensity value histogram (FIG. 3), two intensity levels, vlower and vupper, are calculated such that, as the first moment becomes increasingly closer to vmin, vupper increases and vlower decreases. As the first moment becomes increasingly closer to vmax, vupper decreases and vlower increases.

Let the full dynamic range of the video processing system be given by [VMIN, VMAX], where VMIN and VMAX correspond to the minimum and maximum intensity values capable of being represented in a given video processing system. In the case where a video processing system consists of a video display device, VMIN and VMAX are selected to correspond to the minimum and maximum intensity values capable of being displayed. Intensity values between vmin and vlower are mapped linearly to the range [VMIN, VLOWER], where VLOWER=VMIN+{(vlower−vmin)/3}. Intensity values between vlower and vupper are linearly mapped to the range of [VLOWER, VUPPER], where VUPPER=VMAX−{(vmax−vupper)/3}. Intensity values in the range [vupper, vmax] are linearly mapped to the range [VUPPER, VMAX]. Note that the denominators of the equations for VUPPER and VLOWER include a value of 3. This value is shown for illustrative purposes. Values differing somewhat from 3 may be employed such as, for example, 2.5 or 3.7. Moreover, a different value (i.e., 4.0) may be employed in the denominator of VUPPER, relative to the value employed in the denominator of VLOWER (i.e., 2.3).

The mapping of the intensity values as described in the immediately preceding paragraphs permits proper allocation of the dynamic range of a given video processing system to the actual range of intensity values present in an image to be enhanced.

A second transformation function is used to transform the saturation components of the original image into saturation components for the enhanced image. This second transformation function is determined by applying a histogram stretching procedure to a saturation histogram representing the saturation components of the original image. A first saturation value point, smin, represents the minimum saturation value in the image, and a second saturation value point, smax, represents the maximum saturation value in the image.

An upper limit of saturation, supper, is defined as that saturation level where the area under the saturation histogram from that level to the maximum level of saturation, smax, is equal to a small percentage of the total number of pixels in the image. For example, a suitable percentage could be approximately 0.5% of the total number of pixels. Saturation components in the range of smin to supper are linearly mapped to the entire dynamic range of saturation values [SMIN, SMAX] available in the video processing system. In this manner, small perturbations in the saturation values of pixels are ignored without compromising the integrity of the enhanced image.

Using the first and second transformation functions, the intensity and saturation values of the original image are modified. The hue components of the image are not changed, and remain the same from the original image to the enhanced image. The intensity values, as well as the color saturation values, of the original image have been enhanced to the maximum extent practicable for use in the operational environment of an arbitrarily-selected video processing system. The result is an optimally enhanced color image without the introduction of color distortion.

In some system applications, it may not be feasible to determine the available dynamic range of the video processing system which will be used to perform image enhancement. For example, the dynamic range specifications of the video processing system may be unknown, or it may be desirable to perform image enhancement using any of a plurality of arbitrarily-selected video processing systems, each of which has different characteristics. In such applications, a different set of first and second transformation functions could be employed for each video processing system, wherein each set of transformation functions is optimized for a specific video processing system. Alternatively, one set of arbitrarily-determined transformation functions may be employed, wherein the functions are selected to provide useful transformations for a wide variety of video processing systems, even though the functions are not fully optimized for use with any one system.

The techniques described in the preceding paragraphs with reference to the first and second transformation functions may be applied to a color space other than HSV, although such an application will not necessarily yield optimum results. The process of converting other color spaces into the HSV domain is often computationally intensive, placing excessive demands on system hardware. For some system applications, such as video telephones which communicate using NTSC video signals, the required computations would mandate the use of undesirably expensive hardware.

The process of converting a non-HSV color space into the HSV domain introduces other problems in addition to computational complexities. Certain colors in one color space may not be physically realizable in another color space. For example, some colors in the YCbCr color space of conventional NTSC video signals may convert into negative values of color in RGB color space. Such negative values are not physically realizable.

In view of the foregoing difficulties involved in converting a non-HSV color space into the HSV domain, a method is disclosed for enhancing a color image directly in conventional NTSC YCbCr color space. This method operates in real time and is applicable to any video device which captures color images in an NTSC format.

The luminance (Y) component of a conventional NTSC signal is enhanced following the procedures described above in connection with the intensity component of the HSV color image. Then, if the chrominance components Cb and Cr are modified by the same amount as the luminance (Y) component, color saturation will remain the same as in the original image. The fact that the color saturation will remain the same can be verified through mathematical derivations known to those skilled in the art and disclosed in a textbook entitled, *Computer Graphics, Principles and Practice*, by J. Foley et al., published by Addison-Wesley in 1991. However, in order to optimally enhance a color image, the saturation components of the image can be further modified to improve the overall saturation of the image.

The saturation components of the NTSC image are enhanced by modifying the chrominance components, Cb and Cr, by a greater amount than the amount by which the luminance component, Y, has been enhanced. In other words, the slope of the transformation function applied to the chrominance components (the chrominance transformation function) should be greater than the slope of the transformation function applied to the luminance component (the luminance transfer function). In cases where the luminance component is modified to a relatively large extent by the luminance transformation function, this is an indication that the original image is relatively unsaturated. The modification performed by the luminance transformation function is inversely proportional to the amount of saturation in the original image. Therefore, in cases where the saturation is relatively low, the saturation should be increased proportionally, with reference to circumstances where the saturation is relatively high.

One technique for measuring the amount by which saturation should be increased is by computing the deviation from linearity of the luminance transformation function. With reference to FIG. 1, the y axis which represented "intensity output" is now conceptualized as representing luminance output levels, and the x axis is now conceptualized as representing luminance input levels. For each of a plurality of luminance levels, the absolute difference between the piece wise linear mapping function 102 and an identity mapping function 103 is calculated. The absolute differences for all of the luminance levels are then summed up to obtain the total deviation from linearity, denoted by Dev. Then, the following equation is employed to calculate the value of incr. incr is used to determine the amount by which the chrominance components should be increased: $1.0 < (incr = Dev/8000) \leq 2.0$. The value of 8000 in the denominator is a representative value set forth for purposes of illustration. Other numerical values may be employed in the denominator in place of 8000 such as, for example, 7000, which also provides useful performance.

Figure 6:
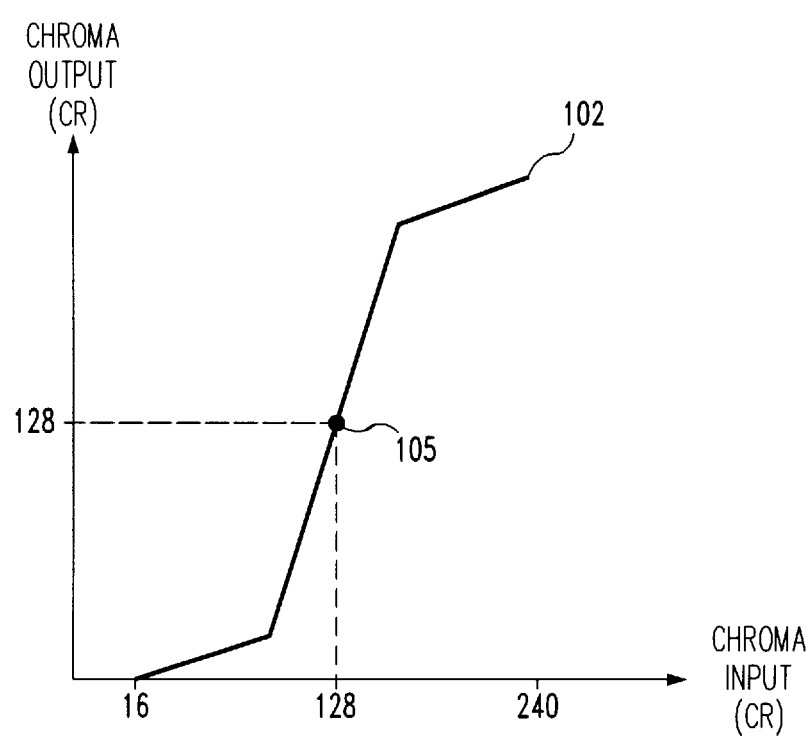
FIG. 6 is a graphical representation of a transformation function for mapping the Cr chroma component of a color image.
Figure 7:
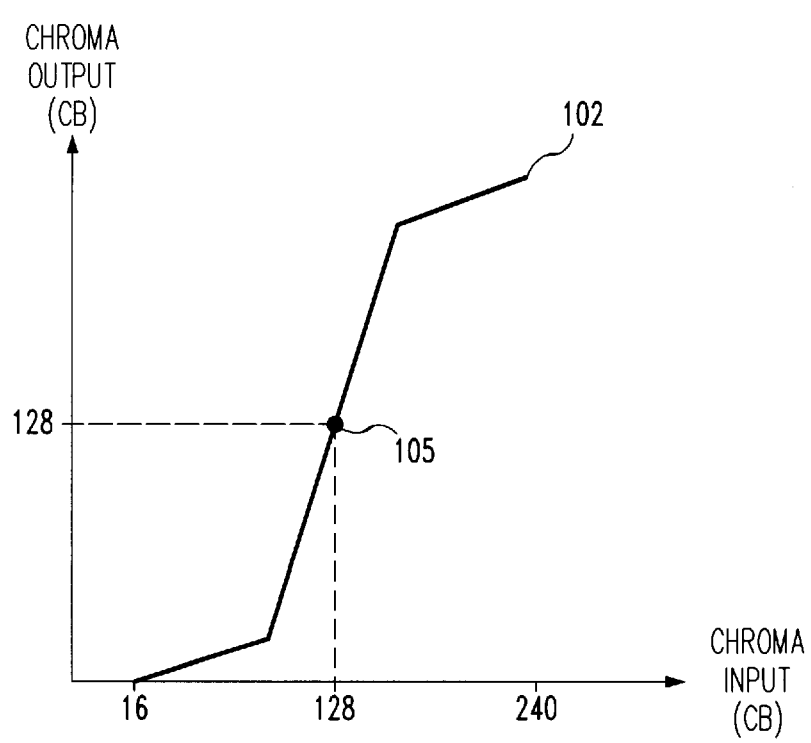
FIG. 7 is a graphical representation of a transformation function for mapping the Cb chroma component of a color image.

Refer now to FIG. 6, which is a graphical representation of a transformation function for mapping the Cr chroma component of a color image, and also to FIG. 7, which is a graphical representation of a transformation function for mapping the Cb chroma component of a color image. The slope of the piecewise linear mapping function 102 (FIGS. 6 and 7) for the range [vlower, vupper] (FIG. 1) is multiplied by incr to obtain the slope of the chrominance transfer function. The actual minimum and maximum levels of chrominance in the original image are mapped to the entire chrominance component dynamic range (FIGS. 6 and 7). A white point 105 corresponding to a chrominance level of 128 for both Cr (FIG. 6) and Cb (FIG. 7) is mapped to itself by the chrominance transfer function. Using the luminance and chrominance transfer functions, the luminance and chrominance components values of the original image are transformed to create an optimally enhanced image directly in YCbCr color space. YCbCr color space may be employed in the context of conventional PAL, SECAM, and/or NTSC video signals.

Another preferred embodiment disclosed herein enhances gray-level textual and/or document images by decreasing the blurring of the image and by increasing the contrast between light and dark regions of the image. These gray-level images may be represented, for example, in NTSC YCbCr color space. A major objective of text image enhancement is to increase the readability of text. Since readability of a text image is determined by the luminance component of the image, this method focuses on enhancing the luminance (Y) component. If the color information present in a given image is very limited, then the chrominance components Cb and Cr may not require any processing. Otherwise, Cb and Cr may be processed as described in the immediately preceding paragraphs.

Detection of the amount of color information in an image is performed by determining the amount of histogram spread of the Cb and Cr components. If the histogram spread is smaller than a given threshold, i.e., approximately 23, then the text image is treated as a gray-level image and only the luminance component is enhanced.

One possible approach for textual image enhancement is to stretch the Y histogram to the maximum available dynamic range, thereby enhancing image contrast. Although this approach improves the image, further improvements are possible. Pursuant to the method disclosed herein, the background gray level of the text image is determined. Textual images generally contain a relatively limited number of discrete gray levels, as is the case for binary documents, black text on white background, etc. The background gray level corresponds to a significant peak in the Y (luminance) histogram. Such a luminance histogram is similar to the intensity value histogram, except that pixel luminance values are graphed in lieu of pixel intensity values. The peak in the Y (luminance) histogram is detected by checking the gray level at which the peak detection signal crosses over zero from negative values to positive values. The peak detection signal is generated by computing the difference between the cumulative histogram and a smoothed version of the cumulative histogram, the degree of smoothing determining the sensitivity of the peak detection.

For purposes of the present example, the one peak in the Y histogram which represents the background gray level must be detected. This detection process is dependent upon whether the original document (i.e., textual image) has a high gray level background or a low gray level background. For high gray level backgrounds, starting from the maximum gray level in the histogram, the first peak encountered in the histogram is the background gray level. For low gray level backgrounds, starting from the minimum gray level in the histogram, the first peak encountered in the histogram is the background gray level.

Assume, for purposes of the present example, that the textual image has a high gray level background denoted as ybkg. As stated above, an alternative for locating the background gray level is merely to locate the first peak from the high gray level end of the Y histogram. However, the Y histogram should be smoothed first (using conventional smoothing procedures), otherwise the searching process will locate a peak in a local area having a relatively small perturbation, while entirely missing the larger peak representing the actual background gray level.

The minimum foreground value of the document, denoted as ymin, can be located by examining the Y histogram from its lower gray level end. During the search, the first few minimum values corresponding to a small percentage of total number of pixels are ignored. This small percentage may be in the vicinity of 0.1%, as an illustrative example, thereby allowing the method to skip relatively small perturbations in the observed gray levels of the textual image.

The contrast of the textual image is enhanced by mapping the Y (luminance) component from [ymin, ybkg] to [YMIN, YMAX], where YMIN and YMAX are, respectively, the minimum and maximum Y values of the video processing system. Before mapping the Y values, a technique generally known to those skilled in the art as unsharp masking is applied to the Y components of the entire image to remove any blurring from the textual image. Conventionally, this sharpening operation causes the appearance of halos around the text edges, which is not very pleasing to human eyes. Since these halos are caused by overshoots in pixel values above the background gray level, ybkg, the halos can be easily removed using standard methods known to those skilled in the art after mapping the Y values from [ymin, ybkg] to [YMIN, YMAX]. Note that the mapping function should be determined before the unsharp masking is applied to the image; otherwise, the background level cannot be detected correctly and the halos can no longer be removed.

Due to the fact that the textual image enhancement method described herein takes into consideration the characteristics of the actual textual image, the method effectively removes blurring from the image and maximizes contrast. In addition, if the original and the enhanced images are both compressed in a format known to those skilled in the art as JPEG, relatively few blocking artifacts will appear in the enhanced image. Fewer blocking artifacts appear because the enhanced image includes a more uniform background and more uniform foreground gray levels. Although the textual image enhancement method was described in the context of YCbCr color space, the method is also applicable to other color spaces.

Figure 4:
FIG. 4 is a color pictorial representation showing the application of the color image enhancement procedures disclosed herein to an illustrative image.

FIG. 4 is a pictorial representation showing the application of the color image enhancement procedures disclosed herein to an illustrative color image. In order to demonstrate the effectiveness of the methods disclosed herein, an illustrative image 400 was manually degraded to provide a test image 402. Illustrative image 400 and test image 402 are in YCbCr color space. First enhanced image 404 is the enhanced image which results when a transfer function is applied only to the Y component of the test image 402. As was predicted above, the color of the enhanced image 404 is not enhanced relative to the test image 402.

Second enhanced image 406 is the image which results when transfer functions are applied to the luminance and chrominance components of the test image 402. Color distortion, caused by interactions between the various color components, is clearly observed. Some type of color compensation scheme must be used to account for interactions between the various color components, and to remove such color distortion.

Third enhanced image 408 is the image which results when any of a number of commercially-available image processing software packages are utilized. These software packages generally includes some type of color compensation scheme which accounts for interactions between the various color components. Even though the color is not distorted, these prior art software packages do not provide an optimally enhanced image.

The test image 402 may be optimally enhanced by using the methods disclosed herein, as described above in connection with FIGS. 1–3. Such an optimally enhanced image 410 is shown in FIG. 4. By comparing each of the enhanced images 404, 406, 408, 410 with the illustrative image 400, it is observed that the methods disclosed herein enhance contrast and color saturation to the maximum extent practicable. Moreover, the methods disclosed herein do not provide color distortion.

Figure 5:
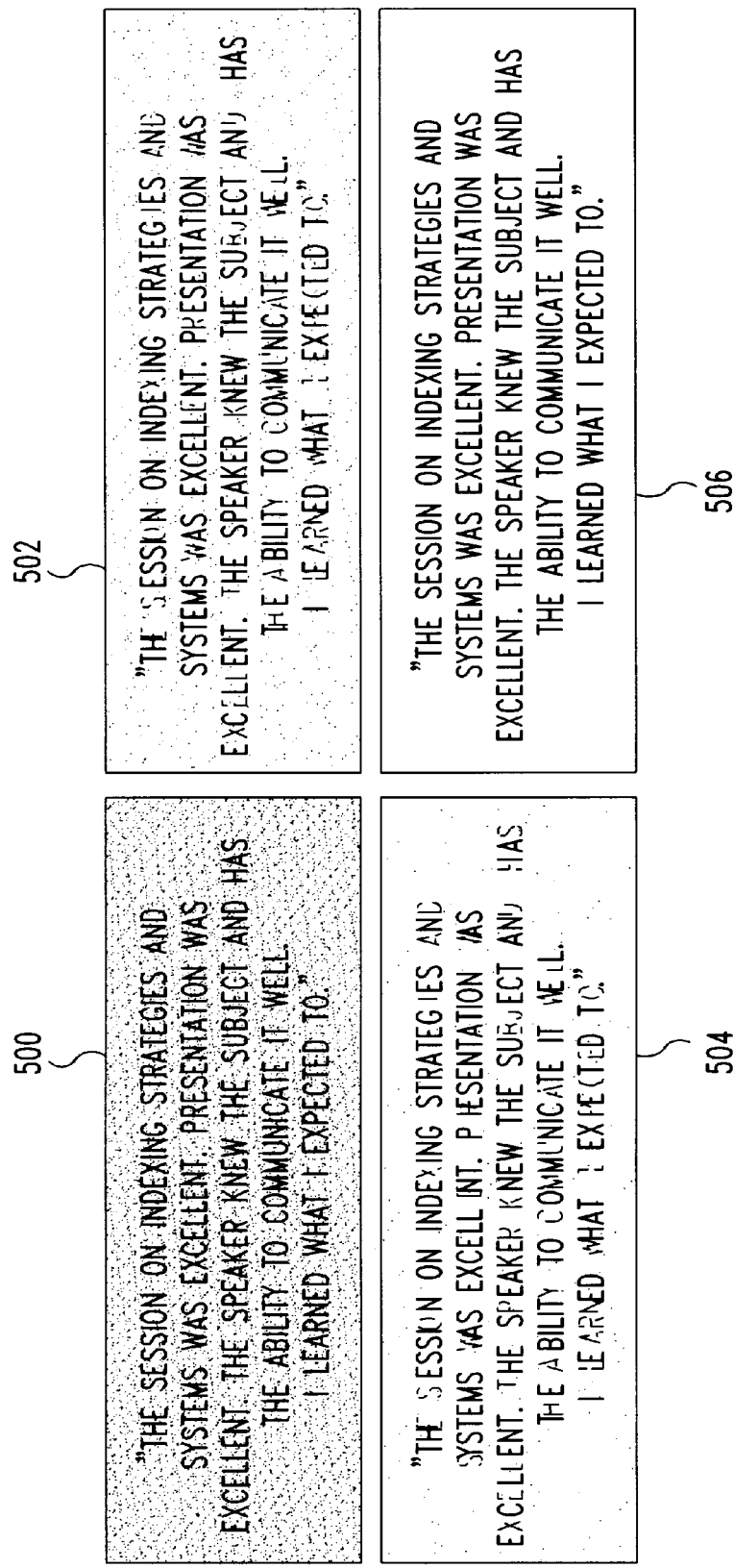
FIG. 5 is a pictorial representation showing the application of the gray-scale image enhancement procedures disclosed herein to an illustrative optically-scanned document.

FIG. 5 is a pictorial representation showing the application of the gray-scale image enhancement procedures disclosed herein to an illustrative optically-scanned document. Textual image 500 is a portion of an original textual image obtained from an AT&T Picasso Still Image Phone. The AT&T Picasso Still Image Phone is disclosed in copending U.S. patent application Ser. No. 08/202,608. Enhanced image 502 was prepared using a Y histogram stretching process as described above, followed by unsharp masking. It is observed that the contrast is not optimized, and that halos have been introduced by the masking process. Enhanced image 504 was prepared using the mapping function described above and generated from the detected background gray level. Note that some blurring is present. Enhanced image 506 was prepared using the methods disclosed herein. It is observed that the contrast of the image has been optimized, and the blurring has been removed.

Figure 8:
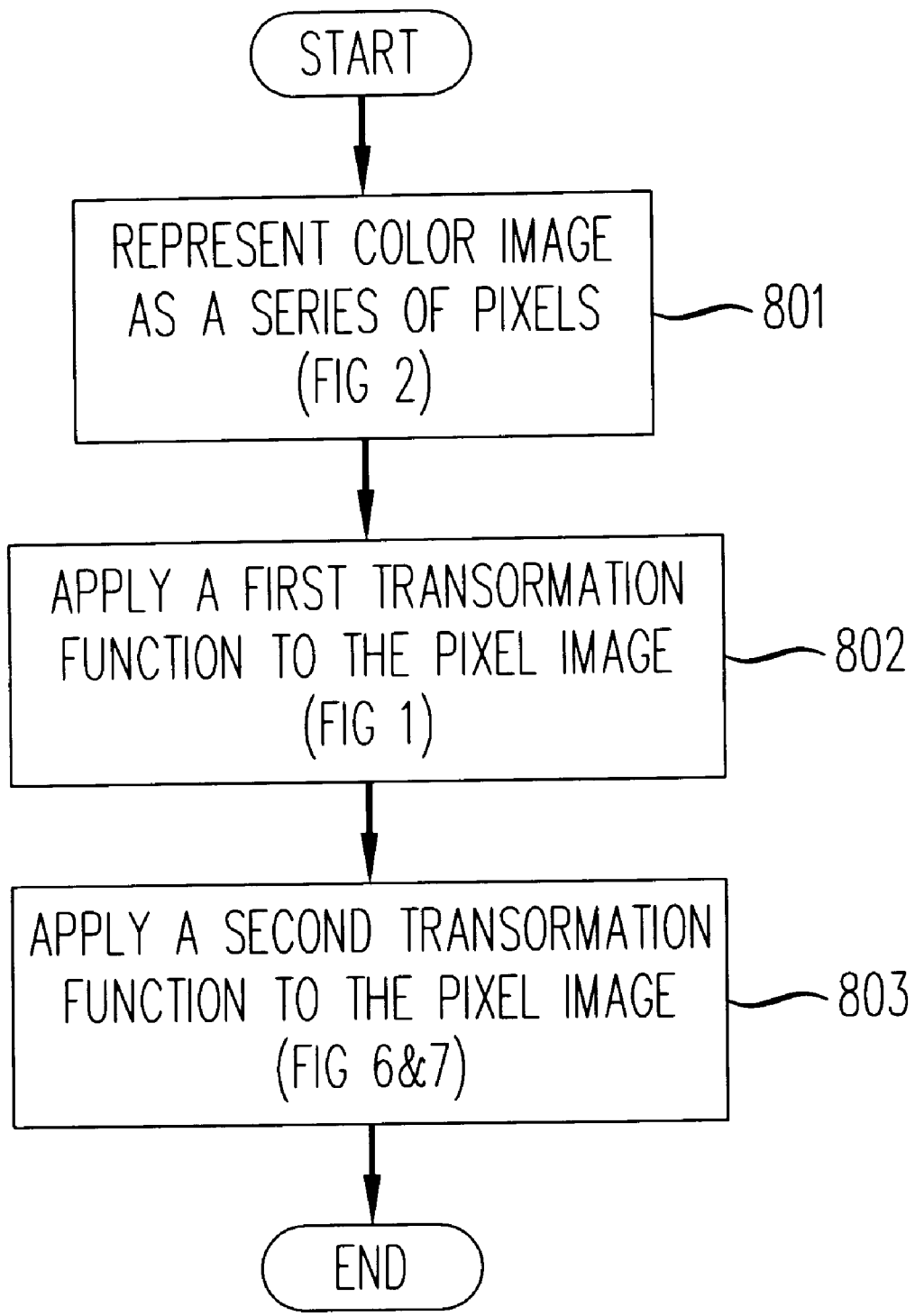
FIG. 8 is a flowchart showing an illustrative image enhancement technique.

FIG. 8 is a flowchart showing an illustrative image enhancement technique according to a preferred embodiment described herein. The procedure commences in block 801 where a color image is represented as a series of pixels. An illustrative pixel representation is shown in FIG. 2. The program advances to block 802 where a first transformation function is applied to the color image. An example of a suitable transformation function was described in conjunction with FIG. 1. Next, at block 803, a second transformation function is applied to the color image. The second transformation function was described in connection with FIGS. 6 and 7.

We claim:

1. A method of enhancing a color image using a video processing system equipped to represent a dynamic range of intensity values and a dynamic range of saturation values, the method comprising the following steps:

(a) representing the color image by a plurality of pixels in $YC_rC_b$ (luminance and chrominance) color space, the color image having a finite range of luminance values and a finite range of chrominance values;

(b) applying a first transformation function to the finite range of luminance values and a second transformation function to the finite range of chrominance values; the first transformation function transforming the first finite range of luminance values to correspond to the entire dynamic range of luminance values; and the second transformation function transforming the finite range of chrominance values to correspond to the entire dynamic range of chrominance values;

the first and second transformation functions providing an enhanced image having fully optimized luminance and chrominance values without converting a color image from $YC_rC_b$ color space to another color space, wherein the first transformation function is a piece wise linear mapping function in two dimensions having three substantially linear regions defined by four intensity value points; the first dimension representing the finite range of luminance values, and the second dimension representing the dynamic range of luminance values;

(c) defining a first luminance value point as being represented by the minimum luminance value in the image;

(d) defining a second luminance value point as being represented by the maximum luminance value in the image;

(e) selecting third and fourth intensity value points having values in the first dimension between the first and second luminance value points, wherein the piece wise linear mapping function consists of first, second, and third line segments, the first line segment being defined by points vmin and vlower, the second line segment being defined by points vlower and vupper, and the third line segment being defined by points vupper and vmax, such that vmin is the minimum luminance value in the image, vmax is the maximum luminance value in the image;

(f) selecting vlower and vupper based upon the relative overexposure or underexposure of the image such that, if the image is relatively under-exposed, vlower is selected to be relatively close to vmin and vupper is selected to be relatively distant from vmax, thereby compressing high luminance values and expanding low luminance levels; and if the image is relatively over-exposed, vupper is selected to be relatively close to vmax, and vlower is selected to be relatively distant from vmin, thereby compressing lower luminance values and expanding higher luminance values;

wherein vupper and vlower are calculated by performing the steps of:

(i) developing a luminance value histogram for the image to be enhanced by dividing the range from vmin and vmax into a plurality of sub-ranges such that, for each of the plurality of sub-ranges, the number of pixels in the image having luminance values in this sub-range is calculated; the center of gravity of the luminance value histogram being defined as the first moment and being indicative as to the relative over- or under-exposure of the image, such that the first moment is relatively closer to vmin than to vmax for an underexposed image and relatively closer to vmax than to vmin for an overexposed image; and (ii) selecting vlower and vupper such that, as the first moment becomes increasingly closer to vmin, vupper increases and vlower decreases, and, as the first moment becomes increasingly closer to vmax, vupper decreases and vlower increases.

2. A method of enhancing a color image as set forth in claim 1 wherein vupper and vlower are calculated by performing the steps of:

defining the full dynamic range of luminance values of the video processing system as, wherein VMIN corresponds substantially to the minimum luminance value capable of being represented in the video processing system, and VMAX corresponds substantially to the maximum luminance value capable of being represented in the video processing system;

linearly mapping luminance values in the range of vmin and vlower in the first dimension to luminance values in the range of VMIN and VLOWER in the second dimension, where VLOWER=VMIN+{(vlower-vmin)/m}, where m is a real number in the approximate range of 2 to 4;

linearly mapping luminance values in the range of vlower and vupper in the first dimension to luminance values in the range of VLOWER and VUPPER in the second dimension, where VUPPER=VMAX-{(vmax-vupper)/k}, where k is a real number in the approximate range of 2 to 4; and linearly mapping luminance values in the range of vupper and vmax in the first dimension to the luminance values in the range of VUPPER and VMAX in the second dimension.

3. A method of enhancing a color image as set forth in claim 2 wherein the video processing system consists of a video display device and VMIN and VMAX are selected to correspond to the minimum and maximum luminance values capable of being displayed on the video display device.

4. A method of enhancing a color image as set forth in claim 2 wherein a second transformation function is used to transform the chrominance components of the original image into chrominance components for the enhanced image.

5. A method of enhancing a color image as set forth in claim 4 wherein the luminance values of the image are modified using the first transformation function to provide enhanced image luminance values, and the chrominance values of the image are modified using the second transformation function to provide enhanced image chrominance values.

\* \* \* \* \*